United States Patent [19]
Yamaguchi et al.

[11] Patent Number: 5,548,806
[45] Date of Patent: Aug. 20, 1996

[54] MOBILE COMMUNICATION SYSTEM HAVING A CELL STRUCTURE CONSTITUTED BY INTEGRATING MACRO CELLS AND MICRO CELLS

[75] Inventors: Akira Yamaguchi, Tokyo; Hideo Kobayashi; Toshio Mizuno, both of Saitama, all of Japan

[73] Assignee: Kokusai Denshin Denwa Co., Ltd., Tokyo, Japan

[21] Appl. No.: 185,022

[22] Filed: Jan. 24, 1994

[30] Foreign Application Priority Data

Jan. 25, 1993 [JP] Japan .................................. 5-027112
Feb. 10, 1993 [JP] Japan .................................. 5-045731

[51] Int. Cl.$^6$ .................................................. H04Q 7/36
[52] U.S. Cl. ...................... 455/33.1; 455/33.4; 455/56.1
[58] Field of Search .................................. 455/33.1, 33.2, 455/33.3, 33.4, 54.1, 53.1, 56.1, 52.3, 56.3; 379/59

[56] References Cited

U.S. PATENT DOCUMENTS 5,396,645  3/1995  Huff ...................................... 455/33.3

FOREIGN PATENT DOCUMENTS 00101135  5/1987  Japan .................................. 455/33.4
41529     2/1989  Japan .................................. 455/33.4
0196722   8/1991  Japan .................................. 455/33.4

OTHER PUBLICATIONS

"Third Generation Wireless Information Networks", ISBN 0-7923-9218-3, published by Kluwer Academic Publishers, pp. 12 and 13.
"Mobile Cellular Telecommunication System", ISBN 0-07-037030-3, published by McGraw-Hill Inc., pp. 269 to 282.
ITU-RS (CCIR)TG8/1 Document 8-1/TEMP/85(Rev.1)-E, pp. 13 to 20.
"Wireless Communication Future Direction", ISBN 0-7923-9316-3, published by Kluwer Academic Publishers, pp. 16 to 21.
"Dynamic Channel Assignment Using Subcarrier Multiplexing Techniques In Microcellular Systems", IEEE Vehicular Technology Society 42nd VTS Conference, H. Ichikawa et. al., pp. 645 to 648.
"Mobile Cellular Telecommunication System", ISBN 0-07-037030-3, published by McGraw-Hill Inc., pp. 245 to 265.

*Primary Examiner*—Andrew Faile
*Assistant Examiner*—Thanh Le
*Attorney, Agent, or Firm*—Armstrong, Westerman, Hattori, McLeland & Naughton

[57] ABSTRACT

A mobile communication system has a cell structure constituted by integrating macro cells and micro cells, and at least one mobile station. The cell structure is made to cover a service area by a plurality of the micro cells each having a predetermined size and to cover the same service area by the single macro cell having a larger size than the size of the micro cell. Each of the micro cells includes a micro cell base station for transmitting at least radio control channel at a predetermined frequency and slot. The mobile station includes a measuring unit for repeatedly measuring received level of the radio control channels from the micro cell base stations, an estimation unit for estimating its moving speed in accordance with changing rate of the measured level, and a determining unit for determining, in accordance with the estimated moving speed, that control of a radio link between the mobile station and the base station is executed by a micro cell unit or by a macro cell unit. In one aspect, the macro cells may be virtual macro cells each of which is a virtually treated area covered by a plurality of the micro cells. If the repeatedly arranged virtual macro cells are formed as a layer and also multi-layered so that the service area is closely covered, the spectrum efficiency can be more increased.

17 Claims, 10 Drawing Sheets

MOBILE COMMUNICATION SYSTEM HAVING A CELL STRUCTURE CONSTITUTED BY INTEGRATING MACRO CELLS AND MICRO CELLS

BACKGROUND OF THE INVENTION

1. Field of the Invention

The present invention relates to a land mobile communication system constituted by two independent systems such as a macro-cellular system represented by a car telephone and a micro-cellular system represented by a cordless telephone. More particularly, the present invention relates to a constitution of a radio control channel for integrating these two systems and to a method of estimating the moving speed of a mobile station.

2. Description of the Related Art

Recent mobile land communication systems are classified into two large groups as described in for example "THIRD GENERATION WIRELESS INFORMATION NETWORKS", ISBN 0-7923-9218-3, published by Kluwer Academic Publishers, pages 12 and 13. One group is cellular car telephone systems having a macro cell structure for users moving rapidly. The other group is cordless telephone systems having a micro cell structure for users moving slowly.

In the cellular land mobile communication systems, each cell is constituted by a macro cell having a large radius of about half to several kilometers. The communication between a base station of the macro cell and a mobile station (terminal) located within this macro cell is executed via a radio link with a high transmitting power about several to several hundreds watt. Thus, such the mobile station consumes large power causing the life period of its battery to be limited to short, for example less than one day. Furthermore, since the size of the cell is large, the distance between the cells using the same frequency (co-interference distance) has to be large causing the number of subscribers capable of simultaneous communication to be reduced in comparison with that in the micro-cellular systems. However, as each macro cell covers relatively large area, the number of handovers will be reduced. This is advantageous for the rapidly moving mobile station.

On the other hand, in the cordless telephone systems, each cell is constituted by a micro cell having a small radius of about several tens to one hundred meters. Thus, the distance between the cells using the same frequency (co-interference distance) has to be short causing the number of subscribers capable of simultaneous communication to be increased in comparison with that In the macro-cellular systems. Since the cell size is small, the communication between a base station of the micro cell and a mobile station located within this micro cell can be executed via a radio link with a low transmitting power of about several milliwatt. Therefore, the battery life of the mobile station will last long for example one week. However, as each micro cell covers relatively small area, handover will frequently occur for the rapidly moving mobile station resulting the control to extremely complicate. Thus, these micro-cellular systems will be utilized only for mobile terminals moving at a low speed such as walking speed.

As aforementioned, the cellular mobile communication system using macro cells and the cordless telephone system using micro cells have both advantages and problems. Namely, the cellular mobile communication system has an advantage of being used in the user moving rapidly, but has problems of low spectrum efficiency and of short battery life. The cordless telephone system has advantages of high spectrum efficiency and of long battery life, but has a problem of being used only in the user moving slowly.

In order to access both the cellular mobile communication system and the cordless telephone system to obtain the above-mentioned advantages of each of the systems, since these systems are constituted by two independent systems, the user must use two different mobile terminals.

SUMMARY OF THE INVENTION

It is therefore an object of the present invention to provide a mobile communication system having a cell structure constituted by integrating macro cells and micro cells, in which a single terminal can selectively make access to a macro cell or to a micro cell.

Another object of the present invention is to provide a mobile communication system which manages a plurality of micro cells as a one virtual macro cell so as to provide service functions offered by the macro-cellular system to the micro-cellular system, and thus a single terminal can selectively make access to the virtual macro cell or to the micro cell.

According to the present invention, a mobile communication system has a cell structure constituted by integrating macro cells and micro cells, and at least one mobile station. The cell structure is made to cover a service area by a plurality of the micro cells each having a predetermined size and to cover the same service area by the single macro cell having a larger size than the size of the micro cell. Each of the micro cells includes a micro cell base station for transmitting at least radio control channel at a predetermined frequency and slot. The mobile station includes means for repeatedly measuring received level of the radio control channels from the micro cell base stations, means for estimating its moving speed in accordance with changing rate of the measured level, and means for selecting, in accordance with the estimated moving speed, the radio link control between the mobile station and the base station to be executed by each micro cell or by each macro cell.

Preferably, the selecting means includes means for selecting the radio link control so as to be executed by a micro cell when the estimated moving speed is a first speed which is substantially equal to or lower than a walking speed, and by a macro cell when the estimated moving speed is a second speed higher than the first speed.

It is preferred that the moving speed estimation means includes means for judging the maximum leveled base station in accordance with the measured received level, means for calculating a period between times at each of which the maximum leveled base station changes, and means for Judging the moving speed is high or low by comparing the calculated period with a threshold value.

The moving speed estimation means may include means for judging the moving speed is high when it is impossible to calculate said period between times at each of which the maximum leveled base station changes.

Preferably, the measuring means includes means for measuring received level of the radio control channels from the micro cell base stations at a predetermined interval.

According to a first aspect of the present invention, each of the micro cells has a micro cell base station, and the mobile station is capable of accessing to both the micro cell base station and the macro cell base station using a common radio interface so as that it makes access to the micro cell base station when the estimated moving speed is the first speed (low speed), and to the macro cell base station when the estimated moving speed is the second speed (high speed).

This first aspect of the invention relates to a mobile communication system having a cell structure integrating micro cells and macro cells both of which have common radio interfaces. The mobile station accesses radio links by selecting, depending upon its moving speed, either the micro cell base station or the macro cell base station which have different cell sizes with each other. When the mobile station is called, the paging channel for informing the call is transmitted from the macro cell base station. The mobile station will wait for the call.

As aforementioned, the mobile station itself estimates its moving speed. Under waiting for call and under communication, the mobile station measures the level of radio control channels and these changing rate with respect to time, transmitted from the micro cell base stations located around this mobile station. The changing rate of the received level will be high when the station moves rapidly, and low when the station moves slowly. Thus, the mobile station Judges its moving speed by comparing the measured changing rate with a predetermined threshold value. In order to estimate the moving speed exactly, it is necessary the radio control channels from the respective micro cell base stations are synchronous with each other.

Therefore, it is desired that the micro cell base stations transmit time division radio control channels respectively, in synchronous with frames of time division radio control channels transmitted from the macro cell base station or frames of time division control channels transmitted via optical fibers from the macro cell base station.

In the conventional mobile communication system, the base station transmits, as control signals. Broadcasting Channel (BCCH) for broadcasting system information, paging channel for informing there occurs a call and a response signal for responding to a request of call originated at the mobile terminal. The mobile terminal transmits a request of originating call and a response against the paging channel.

On the other hand, in the system according to the present invention, the macro cell base station transmits BCCH for the mobile station located within the corresponding macro cell and moving rapidly, and paging channels to all the mobile stations located within this macro cell. The micro cell base station transmits BCCH for the mobile station located within this micro cell and moving slowly.

Under waiting for call, the slowly moving mobile station intermittently receives the paging channel transmitted from the macro cell base station and the BCCHs transmitted from the micro cell base stations, and the rapidly moving mobile station intermittently receives the paging channel and the BCCH both of which are transmitted from the macro cell base station. Also, in order to movement between the cells, the slowly moving station measures the BCCH level received from the micro cells around it, and the rapidly moving station measures the BCCH level received from the macro cells around it.

The mobile station estimates its moving speed at a predetermined interval to know the change of the moving speed.

The speed estimation may be possible when the moving speed of the station is maintained at low and at high, and changed high to low and high to low. However, when the mobile station under waiting for call moves so rapidly that the speed estimation is impossible, the time interval for executing the speed estimation will be adjusted to longer than that causing the power consumption to reduce.

When a call is originated from the mobile station, the mobile station itself estimates its speed, and thus the slowly moving station accesses to the micro cell base station and starts communication with this station, but the rapidly moving station accesses to the macro cell base station and starts communication with this station.

When a call against the mobile station occurs, the mobile station receives paging channels from the macro cell base station, and transmits a response signal to the macro cell base station at rapidly moving or to the micro cell base station at slowly moving.

According to the above-mentioned first aspect, since the mobile station selectively communicates with the macro cell base station or with the micro cell base station depending upon its moving speed, the distance between the cells using the same frequency can be suitably selected. Thus, the number of subscribers capable of simultaneous communication can be adjusted in accordance with the moving speed causing the spectrum efficiency to increase.

According to a second aspect of the present invention, the macro cells are virtual macro cells each of which is a virtually treated area covered by a plurality of the micro cells.

In the system of this second aspect, the mobile station communicates with one of the micro cell base stations via a radio link in spite of its moving speed. Radio link control, however, is executed by each micro cell when the station moves slowly as a walking speed, and executed by each virtual macro cell virtually constituted by a plurality of the micro cells when the station moves rapidly as a speed of running vehicle.

For the rapidly moving station, since it communicates with each of the micro cell with lower transmitting power of about several milliwatt, power consumption can be reduced causing long battery life.

To implement the virtual macro cell, it is necessary to make effective switching of the radio links against the rapidly moving station over the micro cells and also to use a radio link control method providing a high spectrum efficiency. Thus, in this second aspect, the radio link with the mobile station is controlled by a virtual macro cell constituted by a plurality of the micro cells.

Since the communications between the mobile station and the land network are carried out through the base stations disposed in the respective micro cells, it is necessary for the rapidly moving station to switch the micro cell base stations one after another at high speed. For this purpose, a known subcarrier multiplexing techniques described later can be utilized. By this techniques, radio up link signals from the rapidly moving station are received at the base stations of the micro cells which constitute the virtual macro cell. The received signals are converted into optical signals by E/O (Electro/Optical) converters disposed in the micro cell base stations, respectively. The converted optical signals are gathered via optical fibers to a virtual macro cell control device. In the control device, the gathered optical signals are converted into electrical signals by a O/E (Opto/Electrical) converter. Then receiving quality is compared from the converted signals to select a micro cell base station receiving the signal from the mobile station with the best quality. Thus communication with the mobile station is executed via the selected micro cell base station, so that even if the mobile station moves rapidly over the micro cells, a communication service with a high quality can be implemented.

It is preferred that, in the above-mentioned second aspect, the system has a single layer cell structure constituted by a service area covered a plurality of the virtual macro cells arranged so that the micro cells simultaneously using the same frequency in the virtual macro cell are separated with each other by a predetermined necessary distance.

By arranging the virtual macro cells as this, a distance between the cells simultaneously using the same frequency can be shortened than that in the conventional macro cell system, and thus spectrum efficiency can be improved.

It is also preferred that, in the above-mentioned second aspect, the system has a multi-layered cell structure, and each of the layers is constituted by a service area covered by a plurality of the virtual macro cells arranged so that the micro cells simultaneously using the same frequency in the virtual macro cell are separated with each other by a predetermined necessary distance. The virtual macro cells in the same layer are preferably capable of reusing the same radio link.

Since the repeatedly arranged virtual macro cells are formed as a layer and also multi-layered so that the service area is closely covered, the spectrum efficiency can be more increased.

According to the second aspect, the system preferably further includes means for executing a handover provided with radio link switching when the mobile station moves out from its current virtual macro cell so that a virtual macro cell having a center portion located near the mobile station is selected as a next virtual macro cell.

Since a macro cell is selected for as a next cell so that the center position of the next cell is located near the mobile station, communication quality just after the handover can be good enough for preventing a chattered handover from generating.

In the system according to the second aspect of the present invention, it is preferred that the radio link is assigned to the multi-layered virtual macro cells by a fixed assignment or a dynamic assignment. By the fixed radio link assignment, the radio links are first fixedly assigned to each of the virtual macro cell layers. Each of the radio links assigned to the layer is repeatedly reused by all the virtual macro cells in this layer. When the radio link is determined, an empty link and currently unused link among these links will be assigned to the mobile station in tills layer. By the dynamic radio link assignment, all the radio links are commonly owned by all the virtual macro cell layers. An available empty link of all the links is dynamically assigned to the mobile station.

According to the above-mentioned second aspect, a mobile communication system for a rapidly moving mobile station can be provided by using the micro cell base stations of a micro-cellular mobile communication system for a slowly moving mobile station. Thus, the mobile station can save power consumption causing the long battery life. Furthermore, according to this aspect, not only a chattered handover can be prevented from occurring, but also the number of subscribers capable of simultaneous communication can be increased causing the spectrum efficiency to improve.

Further objects and advantages of the present invention will be apparent from the following description of the preferred embodiments of the invention as illustrated in the accompanying drawings.

DESCRIPTION OF THE PREFERRED EMBODIMENTS

Figure 1:
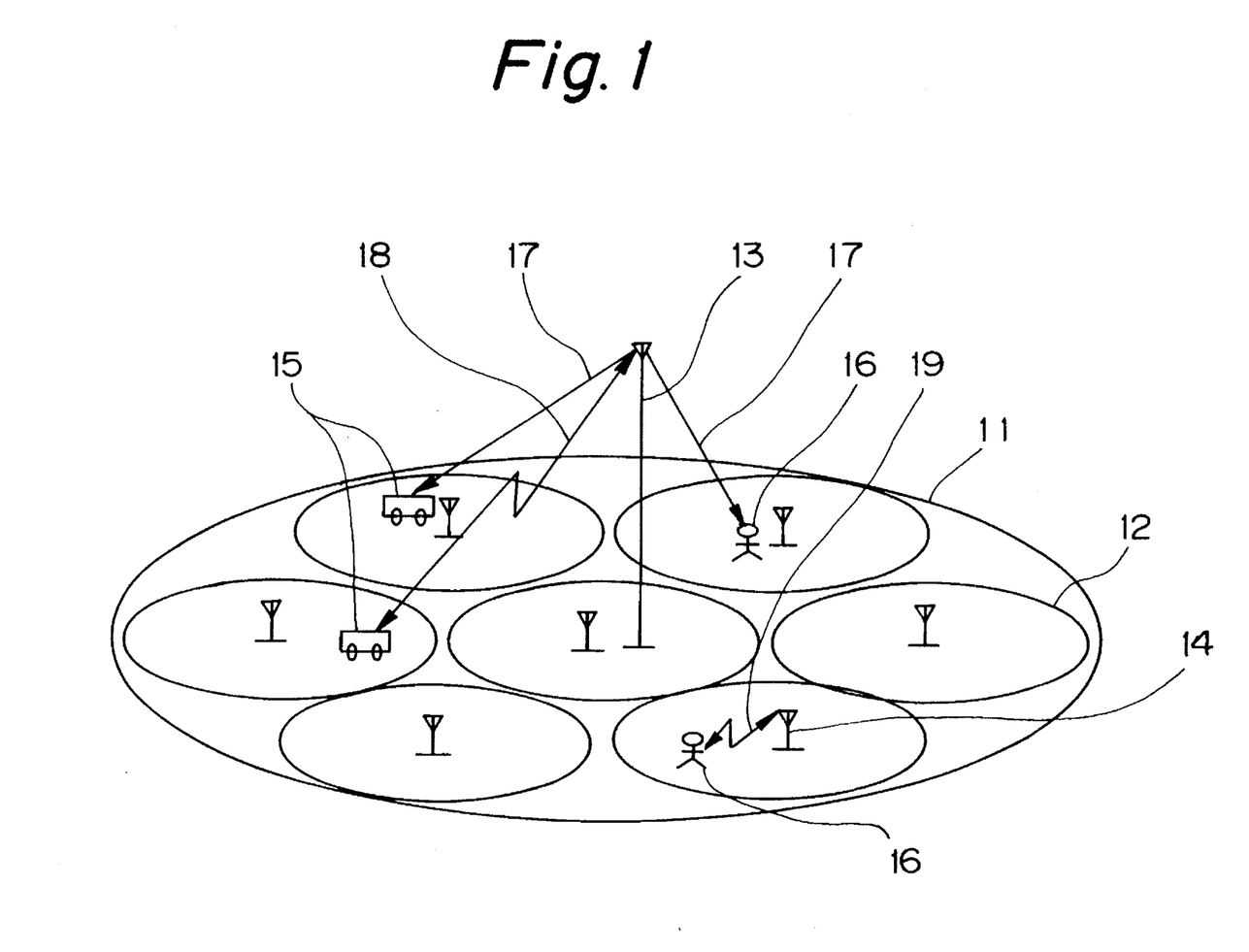
FIG. 1 shows a cell structure of a preferred embodiment of a mobile communication system according to the present invention.
Figure 2:
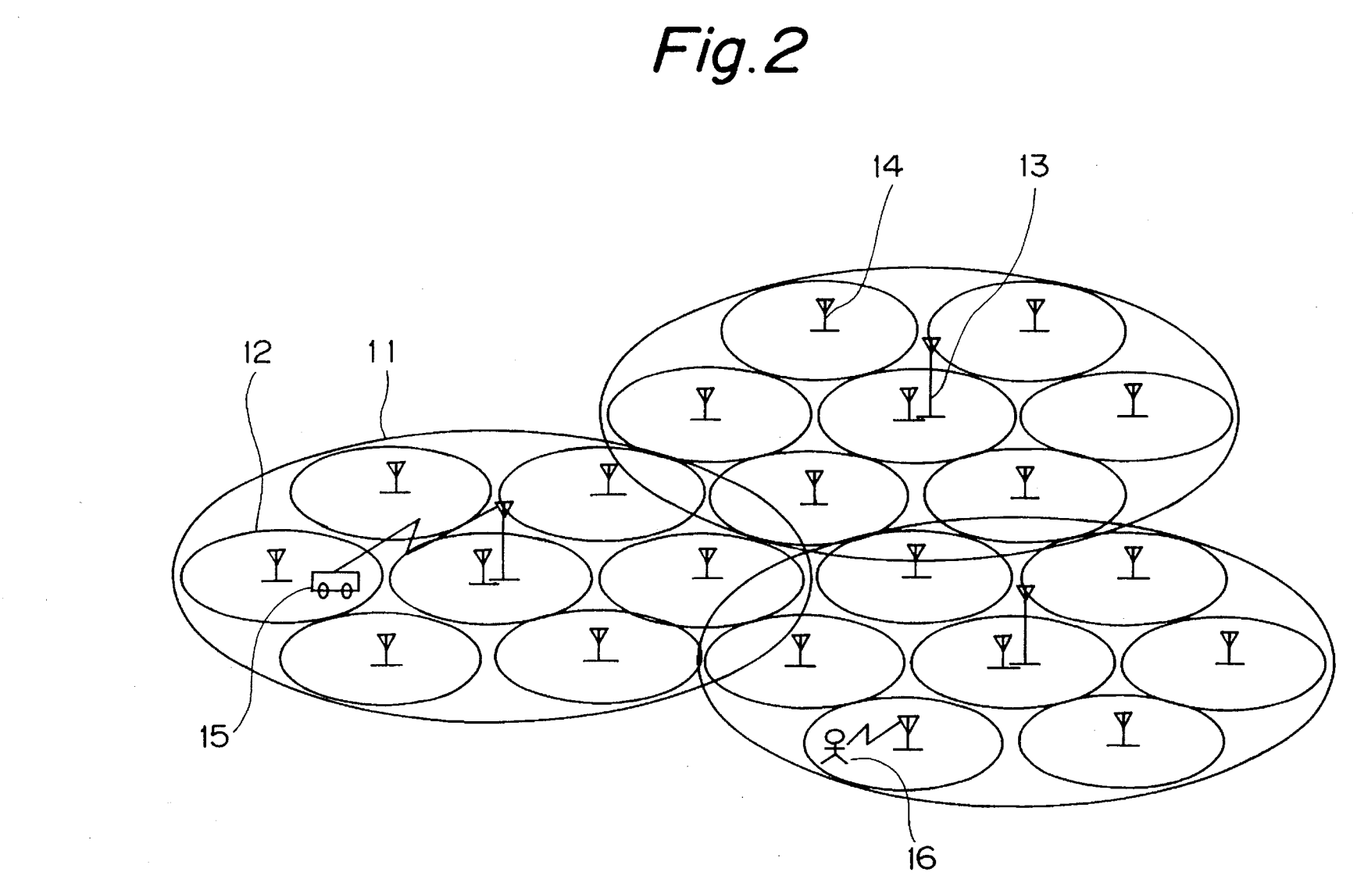
FIG. 2 shows a cell structure covering a service area by a plurality of the macro cells shown in FIG. 1.

FIG. 1 shows a cell structure of a preferred embodiment of a mobile communication system having a cell structure constituted by integrating macro cells and micro cells according to the present invention, and FIG. 2 shows a cell structure covering a service area by a plurality of the macro cells shown in FIG. 1. This cell structure is so-called "an umbrella structure".

In these figures, reference numerals 11 denote macro cells, 12 denote micro cells located in each of the macro cells 11, 13 denote base stations of the respective macro cells 11, 14 denote base stations of the micro cells 12, 15 denote mobile stations rapidly moving as terminals disposed on running vehicles, and 16 denote mobile stations slowly moving as terminals carried by walking operators or disposed on the vehicles slowly moving or stopping, respectively. The rapidly moving mobile stations 15 communicate with the macro cell base station 13 by using common radio interfaces, and the slowly moving mobile stations 16 communicate with the micro cell base station 14 by using common radio interfaces.

In FIG. 1, furthermore, reference numerals 17 denote paging channels transmitted from the macro cell base station 13 for calling the mobile stations 15 and 16 when these stations are called, respectively, 18 denotes control and communication signals transmitted and received between the macro cell base station 13 and the rapidly moving mobile station 15, and 19 denotes control and communication signals transmitted and received between the micro cell base station 14 and the slowly moving mobile station 16.

When a call is originated from the mobile station side, the slowly moving station 16 accesses to the micro cell base station 14 and starts communication with tills station 16 after processing predetermined control sequences. On the other hand, the rapidly moving station 15 accesses to the macro cell base station 13 and starts communication with this station 15 after processing predetermined control sequences.

When a call against the mobile station occurs, the paging channels for calling the rapidly moving station 15 and the slowly moving station 16 are transmitted from the macro cell base station 13 side. The mobile station which has received the paging channel transmits a response signal to the micro cell base station 14 and starts communication with this station 14 after processing predetermined control sequences, when the mobile station is moving slowly. However, when the mobile station is moving rapidly, this station transmits a response signal to the macro cell base station 13 in response to the paging channel and starts communication with this station 13 after processing predetermined control sequences.

Hereinafter, handover or handoff between cells will be described in detail. The handover itself is known in this field. For example, general technique of handover is described in "MOBILE CELLULAR TELECOMMUNICATION SYSTEM", ISBN 0-07-037030-3, published by McGraw-Hill Inc., pages 269 to 282, and also micro cell, umbrella structure of the micro cell, and handover between the micro cells are described in ITU-RS(CCIR)TG8/1 Document 8-1/ TEMP/85(Rev.1)-E, pages 13 to 20.

The mobile station under communication executes different handovers depending upon its moving speed which, according to the present invention, is estimated by the mobile station itself. If a slowly moving mobile station under communication moves out from a micro cell, handover between the micro cells will be executed. If a rapidly moving mobile station under communication moves out from a macro cell, handover between the macro cells will be executed.

If the moving speed of the mobile station varies from high speed to low speed, since the speed change can be detected by the mobile station in this case, the station will transmit a request for handover to a micro cell base station and thus the handover from the macro cell base station to the micro cell base station will be executed.

If the moving speed of a mobile station varies from low speed to very high speed, the handover between the micro cells may be failed. Namely, before completing the handover process between the first and second micro cells, the mobile station will enter into next third micro cell. Also, under this situation, since there is little time for estimating the moving speed of the mobile station, it will be impossible to execute handover in accordance with the estimated moving speed. Therefore, when the handover is failed, it is judged the moving speed is changed from low to high. Then, the handover from the micro cell base station to the macro cell base station is executed.

Figure 3:
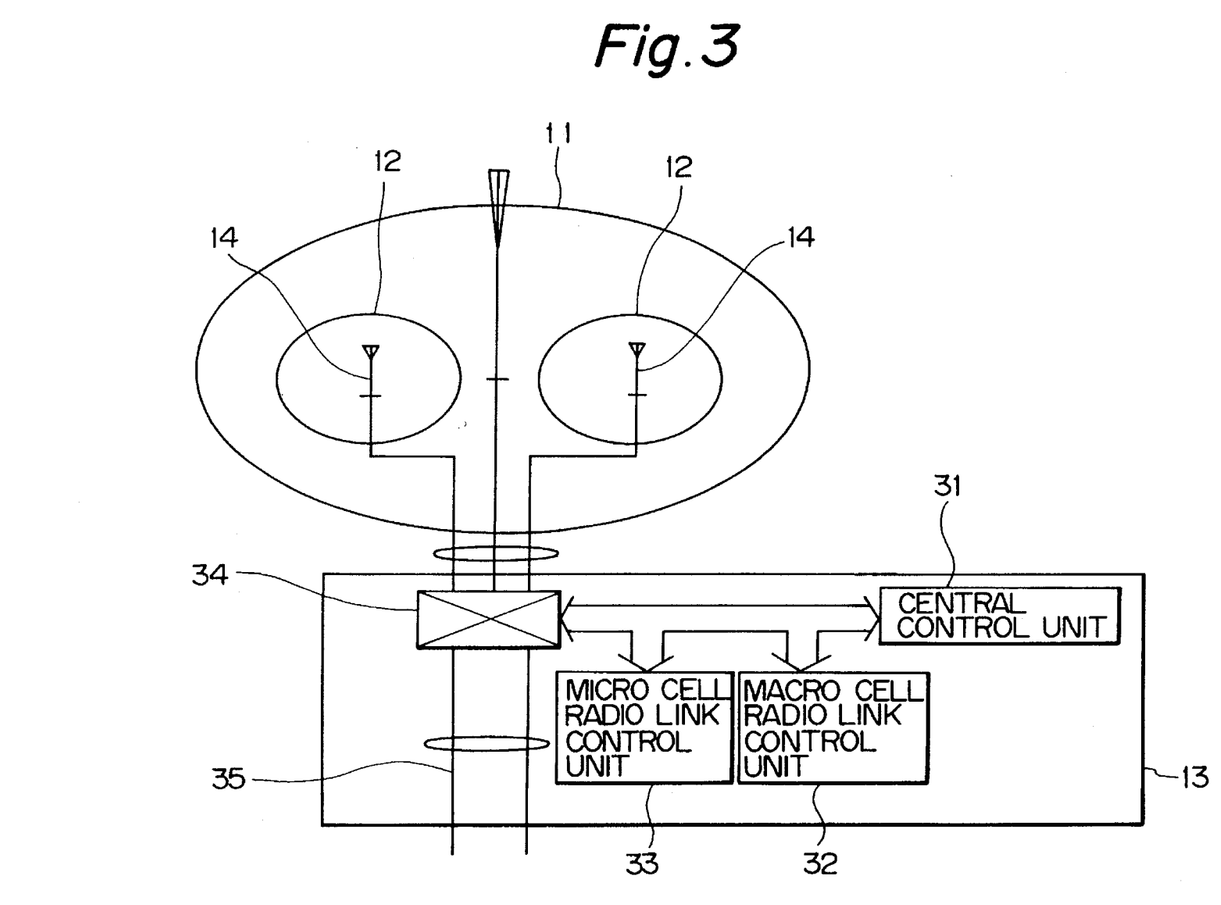
FIG. 3 shows an example of base stations according to the embodiment shown in FIG. 1.

FIG. 3 shows an example of base stations of the embodiment shown in FIG. 1.

In the figure, reference numerals 11 denotes the aforementioned macro cell, 12 denote the micro cells, 13 denotes the macro cell base station, and 14 denote the micro cell base stations. The station 13 consists of a central control unit 31, a macro cell radio link control unit 32 used for rapidly moving stations, a micro cell radio link control unit 33 used for slowly moving stations, and a cross-connect switch 34 for selectively connecting communication channels for the macro cells or communication channels for the micro cells to the public network 35. In this embodiment, the micro cell base stations 14 located in the macro cell 11 are connected via lines, and thus transmitting signals and received signals concerning these base stations 14 are transferred from and to the macro cell base station 13 via the lines.

The radio channel management of the slowly moving mobile stations located in the macro cell 11 is carried out by the micro cell radio link control unit 33, and that of the rapidly moving mobile stations located in the macro cell 11 is carried out by the macro cell radio link control unit 32.

When a certain mobile station in the macro cell 11 is called, a predetermined paging channel for calling this mobile station is transmitted from the macro cell base station 13. The mobile station called from the macro cell station 13 always estimates its moving speed itself intermittently. If the estimated speed is low, this station transmits a response signal to the micro cell base station 14, and then starts communication through a communication channel assigned by the micro cell radio link control unit 33. If the estimated speed is high, this station transmits a response signal to the macro cell base station 13, and then starts communication through a communication channel assigned by the macro cell radio link control unit 32.

Since the paging channels are always transmitted from the macro cell base station 13, each of the mobile stations is not necessary to tell its moving speed information to the base station every time the speed changes. Therefore, load of the base stations for managing the moving speed of the mobile stations can be reduced.

The handover between the cells when the mobile station moves at a constant speed is managed by the macro cell radio link control units 32 or the micro cell radio link control unit 33 dependent upon its speed. If slowly moving, the radio channel management of the handover is executed by the micro cell radio link control unit 33 in this macro cell base station 13. If rapidly moving, the radio channel management of the handover is executed by the macro cell radio link control unit 32 in this macro cell base station 13 and by the macro cell radio link control unit in the next macro cell base station.

When the moving speed of the mobile station under communication varies from high to low, the handover from the macro cell base station 13 to the micro cell base station 14 will occur. In the macro cell station 13 which receives a handover request from the mobile station, the micro cell radio link control unit 33 assigns a particular communication channel to this mobile station via the central control unit 31, and thus the handover of the communication channel from the macro cell station 13 to micro cell station 14 is executed.

When the moving speed of a mobile station under communication varies from low to high, the mobile station transmits a handover request to the macro cell base station 13. In the macro cell station 13 which receives the handover request, the macro cell radio link control unit 32 assigns a particular communication channel to this mobile station via the central control unit 31, and thus the handover of the communication channel from the micro cell station 14 to macro cell station 13 is executed.

The cross-connect switch 34 selectively connecting the communication channel for the micro cells or the communication channel for the macro cell to the public network 35 in response to a designation from the central control unit 31.

Figure 4:
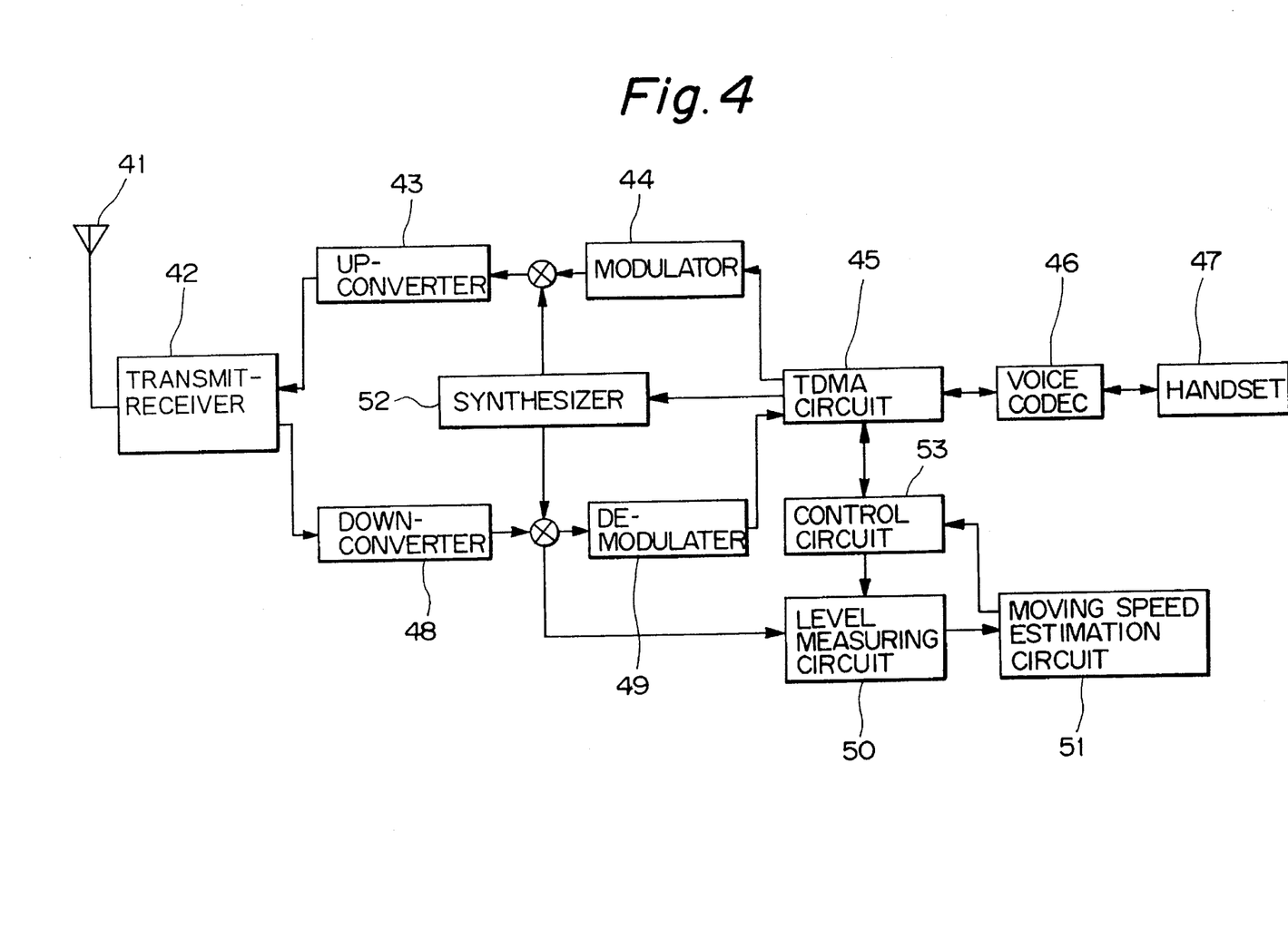
FIG. 4 shows an example of a mobile station according to the embodiment shown in FIG. 1.

FIG. 4 shows an example of a mobile station of the embodiment shown in FIG. 1.

In the figure, reference numerals 41 denotes an antenna, 42 denotes a transmit-receiver for separating or for coupling the received signal and the transmitting signal, 43 denotes an up-converter, 44 denotes a modulator, 45 denotes a TDMA circuit for managing time division signals, 46 denotes a voice CODEC for coding and decoding with respect to voice signals, 47 denotes a handset, 48 denotes a down-converter, 49 denotes a demodulator, 50 denotes a level measuring circuit for measuring the level of the received signals, 51 denotes a moving speed estimation circuit for estimating the moving speed of this mobile station, 52 denotes a synthesizer for setting frequency of the communication channel and the radio control channel, and 53 denotes a control circuit, respectively.

The level measuring circuit 50 measures the received level in order to determine a base station to be accessed during waiting for call after power-on to monitor the received level of the communication channel during communication, to monitor the received level of the radio control channels from another base stations during communication, and to estimate the moving speed of this mobile station.

The control circuit 53 controls the synthesizer 52 and the TDMA circuit 45 so as to adjust frequency and slot of the signals in this mobile station with the frequency and slot of the communication channel assigned by the base station, selects the modulator 44 or the demodulator 45, and manages the voice CODEC 46.

Figure 5:
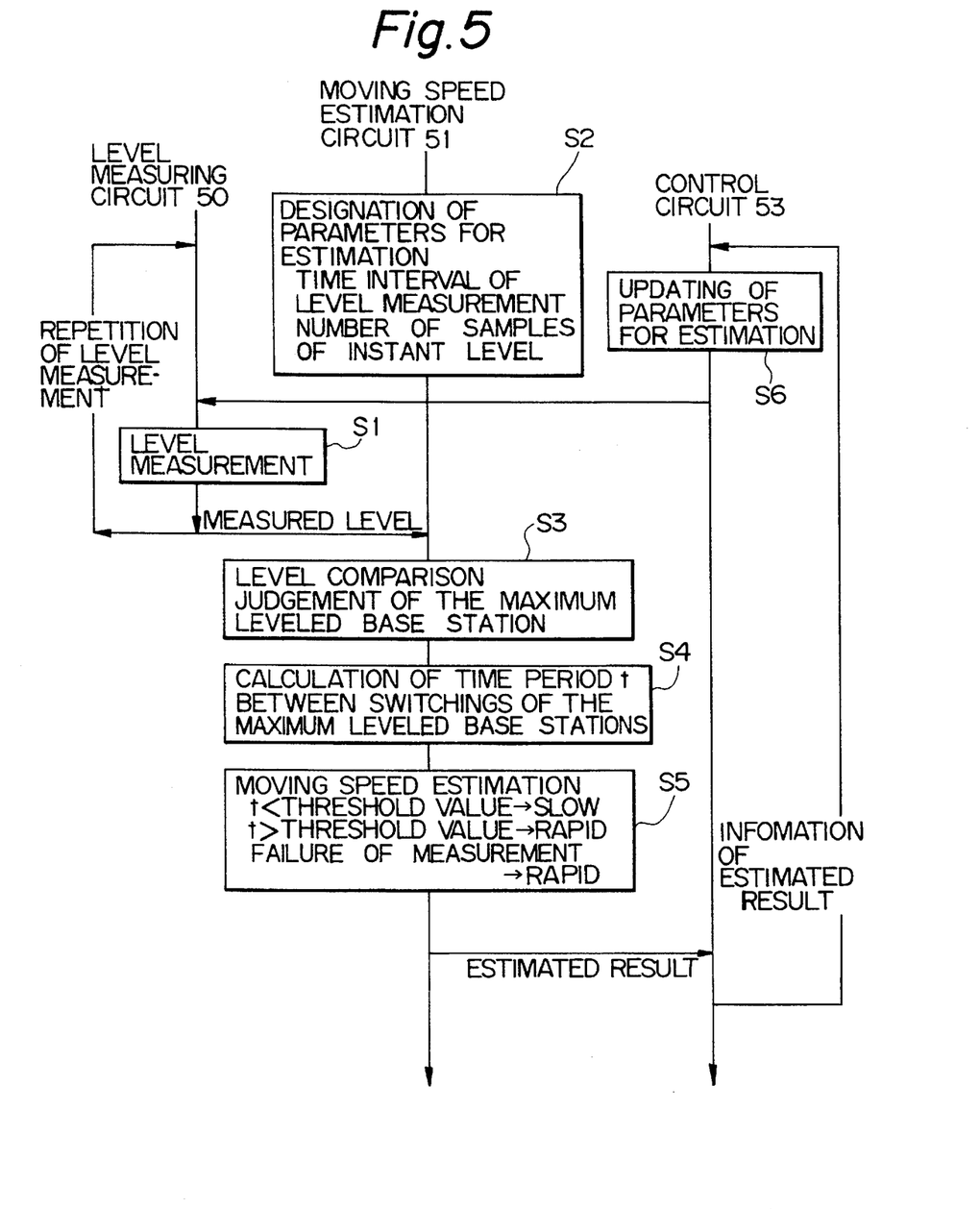
FIG. 5 shows a flow chart of the moving speed estimation process executed by a level measuring circuit, a moving speed estimation circuit and a control circuit.

FIG. 5 is a flow chart illustrating in detail the moving speed estimation process executed by the level measuring circuit 50, the moving speed estimation circuit 51 and the control circuit 53.

Under waiting for call and under communication, the level measuring circuit 50 detects the level of radio control channels, for example Broadcasting Channels (BCCH), transmitted from a plurality of the micro cell base stations located around this mobile station by using empty slots which are not utilized for receiving the radio control channel or the communication channel (step S1). This level measurement is repeated in a time interval designated by the moving speed estimation circuit 51. The moving speed estimation circuit 51 further designates the number of samples of instant received level for calculating an average received level (step S2).

The measured result from the circuit 50 is applied to the speed estimation circuit 51. This moving speed estimation circuit 51 first judges the maximum leveled base station by comparing the received level of the radio control channels from the micro cell base stations, with each other (step S3). Then, the circuit 51 calculates a period t between times each time of which the maximum leveled base station is changed by using already obtained data of the maximum leveled base stations (step S4). Thereafter, the circuit 51 estimates the moving speed of this station by comparing the calculated period t with a threshold value (step S5). If t<threshold value, the speed will be estimated as slow. If t>threshold value, the speed will be estimated as rapid. If t was failed to obtain, it will be estimated as rapid. The estimated result is informed to the control circuit 53.

The control circuit 53 updates the aforementioned parameters in the moving speed estimation circuit 51 in accordance with the obtained estimation result (step S6).

In case that change In the moving speed is detected during communication, the mobile station informs this change to the macro cell base station now communicated with. In case that speed change is detected during waiting for call, the mobile station selects a base station to be accessed between the macro cell base station and the micro cell base station, when calling.

Figure 6A:
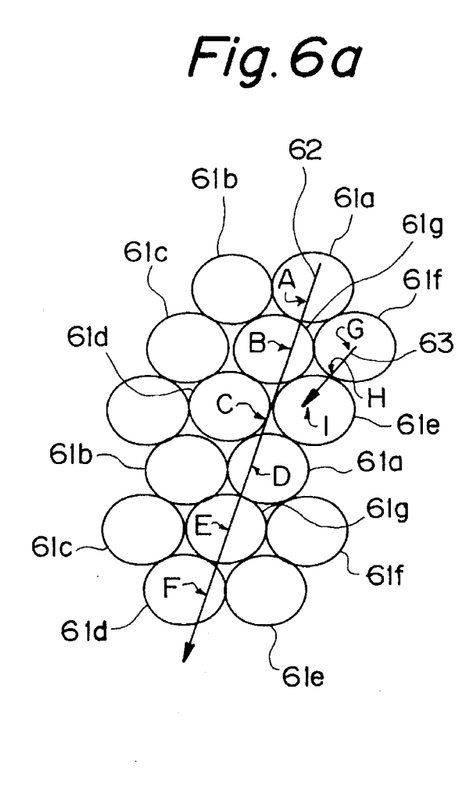
FIGS. 6a, 6b and 6c illustrate the above-mentioned process of estimating the moving speed of the mobile station by an example.
Figure 6B:
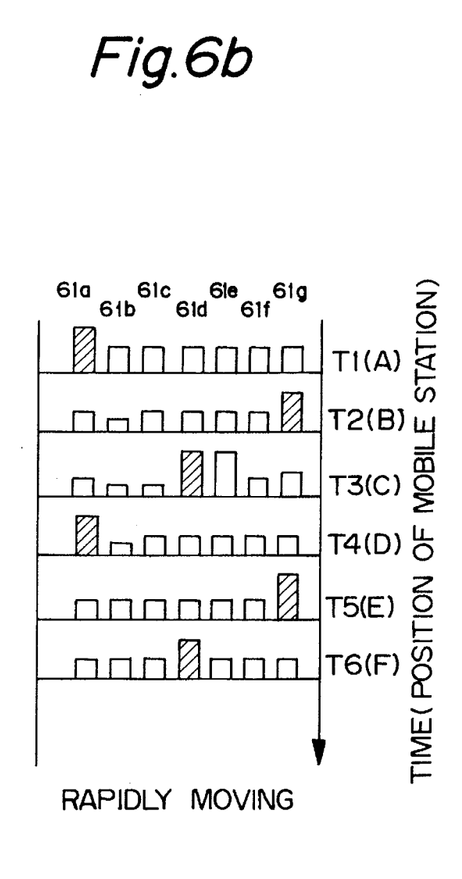
Figure 6C:
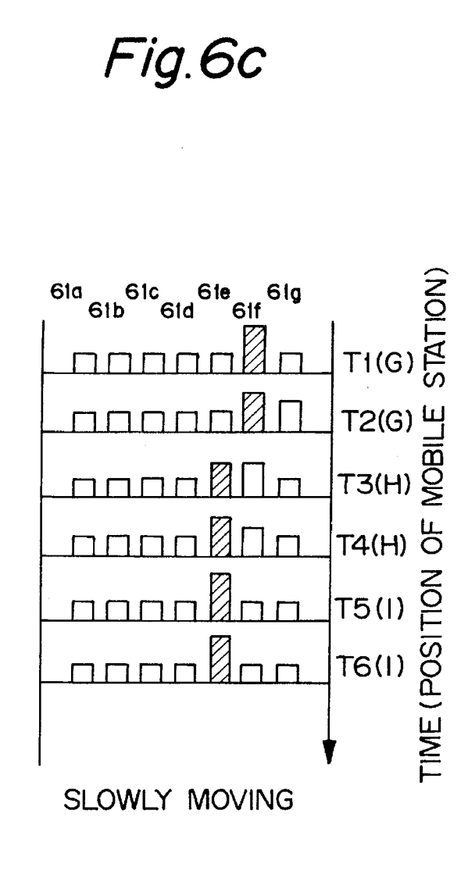

FIGS. 6a, 6b and 6c illustrate the above-mentioned process of estimating the moving speed of the mobile station by an example.

In these figurres, reference numerals 61a to 61g denote identification numbers of radio control channels transmitted from the respective micro cell base stations located in a macro cell. These radio control channels are synchronous with frames of the radio control channel of a macro cell base station in the macro cell. The radio control channels 61a to 61g will be reused in repetition in the micro cells located at a distant with each other so that no interference will occur between them.

In FIG. 6a, a moving path 62 of the rapidly moving mobile station and a moving path 63 of the slowly moving mobile station are illustrated. The illustrated lengths of the paths correspond to moved distances of these stations within the same time period. FIG. 6b is a table showing the received level, in the rapid mobile station moving along the path 62, of the radio control channels 61a to 61g at times T1, T2, . . . T6. FIG. 6c is a table showing the received level, in the slow mobile station moving along the path 63, of the radio control channels 61a to 61g at times T1, T2, . . . T6. In these tables, a radio control channel exhibiting the maximum received level at each time is indicated by hatching.

The mobile station under waiting for call measures the received level of the radio control channel on a predetermined frequency and slot, and then makes tables of the measured result including variation of the received level with respect to time (FIGS. 6b and 6c).

In the rapidly moving station, as shown in table of FIG. 6b, the received level of the radio control channel 61a exhibits the maximum level at time T1 (Locating at a position A on the path 62). Then, the received level of the radio control channel 61g at time T2 (position B), the channel 61d at time T3 (position C), the channel 61a at time T4 (position D), the channel 61g at time T5 (position E), and the channel 61d at time T6 (position F) exhibit the maximum, respectively. Namely, in the rapidly moving mobile station, the radio control channel presenting the maximum received level changes five times during time period of t1 to T6.

On the other hand, in the slowly moving station, as shown in table of FIG. 6c, the radio control channel exhibiting the maximum received level changes only once, from the channel 61f to the channel 61e at a position H, during time period of t1 to T6. Namely, period t between times the maximum leveled radio control channels are changed is very long in comparison with that in the rapidly moving station.

The moving speed of the mobile station can be estimated itself, as aforementioned, by comparing this time period t with a threshold value.

Under waiting for call, the slowly moving mobile station intermittently receives the Broadcasting Channels (BCCHs) transmitted from the micro cell base stations, measures the received BCCHs level, and then estimates the moving speed thereof at a predetermined interval. This speed estimation may be possible when the moving speed of the station is maintained at low and at high, and changed high to low and high to low. However, when the mobile station under waiting for call moves so rapidly that the speed estimation is impossible, the time interval for executing the speed estimation will be adjusted to longer than that causing the power consumption to reduce.

According to the above-mentioned embodiment, the mobile station communicates with the macro cell base station with high transmitting power when it is rapidly moving, and with the micro cell base station with low transmitting power when it is slowly moving. This means that the distance between the cells using the same frequency can be selected in accordance with the moving speed of the mobile station. As a result, the number of subscribers capable of simultaneous communication can be adjusted in accordance with the moving speed causing the spectrum efficiency to increase.

The aforementioned BCCH is well known in this field as described in "WIRELESS COMMUNICATION FUTURE DIRECTION", ISBN 0-7923-9316-3, published by Kluwer Academic Publishers, pages 16 to 21, for example.

Figure 7:
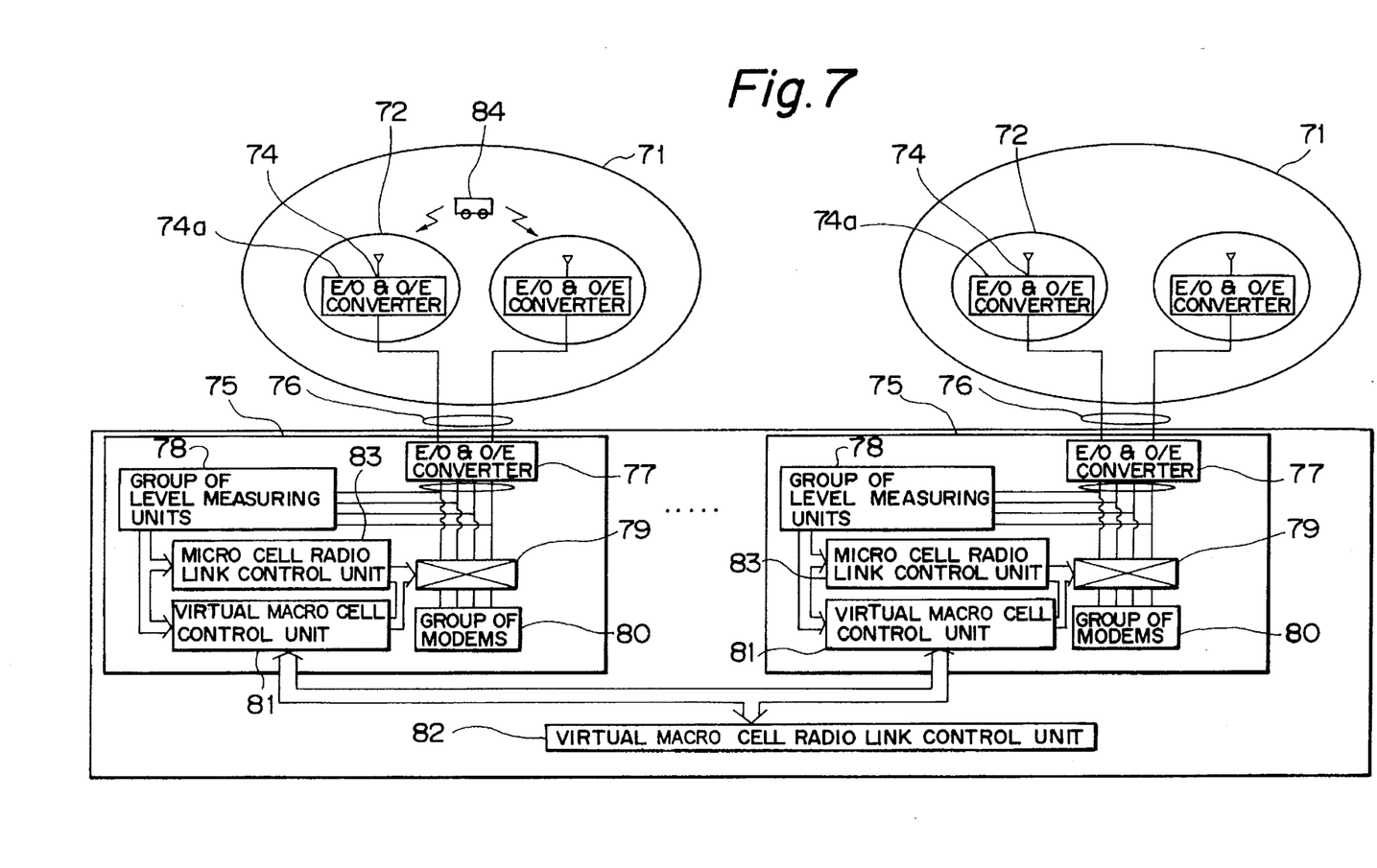
FIG. 7 shows a constitution of an another embodiment of a mobile communication system according to the present invention.

FIG. 7 shows a constitution of an another embodiment of a mobile communication system having a cell structure constituted by integrating macro cells and micro cell is according to the present invention.

In the figure, reference numerals 71 denote virtual macro cells each of which is constituted by a plurality of micro cells 72, 74 denote micro cell base stations, 74a denote E/O (Electro/Optical) and O/E (Opto/Electrical) converters in the respective micro cell base stations 74, 75 denote virtual macro cell control devices, and 76 denote groups of optical fibers. Each group of the optical fibers gathers the received signals from the micro cell base stations 74 to the virtual macro cell device 75 and distributes the transmitting signal from the device 75 to the micro cell base stations 74. The virtual macro cell control device 75 consists of E/O (Electro/Optical) and O/E (Opto/Electrical) converter 77, a group of level measuring units 78 for measuring the received level of the radio channels transmitted from the micro cell base stations 74, a cross-connect switch 79 for selectively connecting lines from the micro cell base station selected depending upon the level measured result to a group of modems 80 consisting of a plurality of modulators and demodulators, a virtual macro cell control unit 81 for controlling the cross-connect switch 79 in accordance with the measured result of the level measuring units 78, and a micro cell radio link control unit 83 for controlling the radio link of a mobile station moving slowly.

In FIG. 7, furthermore, reference numerals 82 denotes a virtual macro cell radio ink control unit for controlling the radio links over a plurality of the virtual macro cells 71 when the radio links are switched and dynamically assigned among the virtual macro cells, and 84 denotes a mobile station.

Under communication between the mobile station 84 and the subscriber via the public network, the transmitted signal from the mobile station 84 is received by the plurality of the base stations 74 of the micro cells 72 which constitute the virtual macro cell 71, via radio up links. In the each micro cell base station 74, the received signal through the radio up link is converted into an optical signal by the E/O converter 74a. The converted optical signals from the micro cell base stations 74 are gathered to the virtual macro cell control device 75 via the optical fibers group 76.

In the virtual macro cell control device 75, the gathered optical signals from the plurality of the micro cell base stations 74 In the virtual macro cell. 71 are converted into electrical signals by using the O/E converter 77. The converted electrical signals are applied to the level measuring units 78 so as to measure their level. The result of the level measurements is applied to the virtual macro cell control unit 81. This virtual macro cell control unit 81 selects, in accordance with the measure result, the micro cell base station 74 which has received the signal from the mobile station 84 with the best quality, and connects only the selected micro cell base station to the modems 80 by means of the cross-connect switch 79. The signal from the subscriber via the public network is transmitted to the mobile station 84 via such the selected micro cell base station.

Switching of the radio links when the mobile station 84 rapidly moves between the plurality of the micro cells 72 is carried out by switching the cross-connect switch 79 so as to selectively connect the micro cell base station 72 with the modems 80. Therefore, the virtual macro cell control device 75 can continuously use the same modems even when the mobile station 84 moves between the micro cells 72 in this virtual macro cell 71. Also, the rapidly moving mobile station 84 can use the same radio link without switching it so far as the mobile station moves within this virtual macro cell 71. As a result, the break time due to radio link switching can be reduced to only the switching time of the cross-connect switch 79 causing the rapidly moving mobile station 84 to obtain high quality communication service.

As aforementioned, assignment and switching of the radio links for the rapidly moving mobile station 84 are managed by a virtual macro cell unit. However, for the slowly moving mobile station 84, assignment and switching of the radio links are managed by a micro cell unit.

The signal transmitted from the slowly moving station 84 via the radio up link is received by only the micro cell base station 74 of the micro cell 72 in which the mobile station 84 is located. This received signal is converted into an optical signal by the E/O converter 74a, and then transmitted to the virtual macro cell control device 75 via the optical fibers group 76. In the device 75, the applied optical signal is converted into an electrical signal by the O/E converter 77 and fed to the modems 80 via the cross-connect switch 79.

The micro cell radio link control unit 83 manages assignment of the radio links of all the slowly moving mobile stations located within the virtual macro cell 71. When the slowly moving station 84 moves out from the micro cell 72, there occurs handover including switching of the radio links. At that time, the micro cell radio link control unit 83 manages assignment of the radio links of the micro cells around the new micro cell into which this mobile station 84 enters, and judges whether the radio link now using can be continuously utilized in the new micro cell depending upon the measured level obtained from the level measuring units 78. If the same radio link cannot be used in the new micro cell, a different radio link will be assigned to the mobile station at the new micro cell. If the same radio link can be utilized the cross-connect switch 79 in the virtual macro cell control device 75 is switched from the old micro cell base station to the new micro cell base station. In the latter case, the slowly moving mobile station 84 can obtain high quality communication service as well as in the rapidly moving station.

Since the mobile station 84 communicates through a radio link selectively switched, in accordance with its moving speed, between the radio link managed by the virtual macro cell control unit 81 and the radio link managed by micro cell radio link control unit 83, it is necessary to have function for estimating its moving speed. This estimation of the moving speed is executed by the mobile station itself, and is the same as that in the aforementioned embodiment of FIGS. 1 and 2. The micro cell base stations 74 transmit time division control signals having different frequency and slot with each other, respectively. The mobile station 84 located in the micro cell 72 repeatedly receives the available time division control signals on the respective frequencies and slots transmitted from the plurality of the micro cell base stations.

When the power turns on, the mobile station 84 itself estimates its moving speed and informs the estimated result to the virtual macro cell control device 75. After that, the mobile station 84 under waiting for call repeatedly estimates its moving speed at a predetermined interval. If a change of the moving speed from high to low or from low to high is detected, the mobile station 84 reports the moving speed change to the virtual macro cell control device 75.

When a call from or to the mobile station 84 occurs, a radio link is assigned to the mobile station dependent upon its moving speed. To the high-speed moving station 84, the radio link is managed by the virtual macro cell controller 81 in each virtual macro cell 71, whereas to the low-speed moving station 84, the radio link is managed by the micro cell controller 83 in each micro cell 72. Even under communication, the mobile station 84 repeatedly estimates its moving speed at a predetermined interval. If a change of the moving speed from high to low is detected, switching of the radio link from one managed by the virtual macro cell controller 81 to one managed by the micro cell controller 83 is executed, and vice versa.

Radio link control of the mobile terminal using a virtual macro cell composed of a plurality of micro cells and high speed switching control of micro cell base stations by the high speed running mobile terminal are described in "DYNAMIC CHANNEL ASSIGNMENT USING SUBCARRIER MULTIPLEXING TECHNIQUES IN MICRO-CELLULAR SYSTEMS", IEEE Vehicular Technology Society 42nd VTS Conference, H.Ichikawa et.al., pages 645 to 648.

Figure 8:
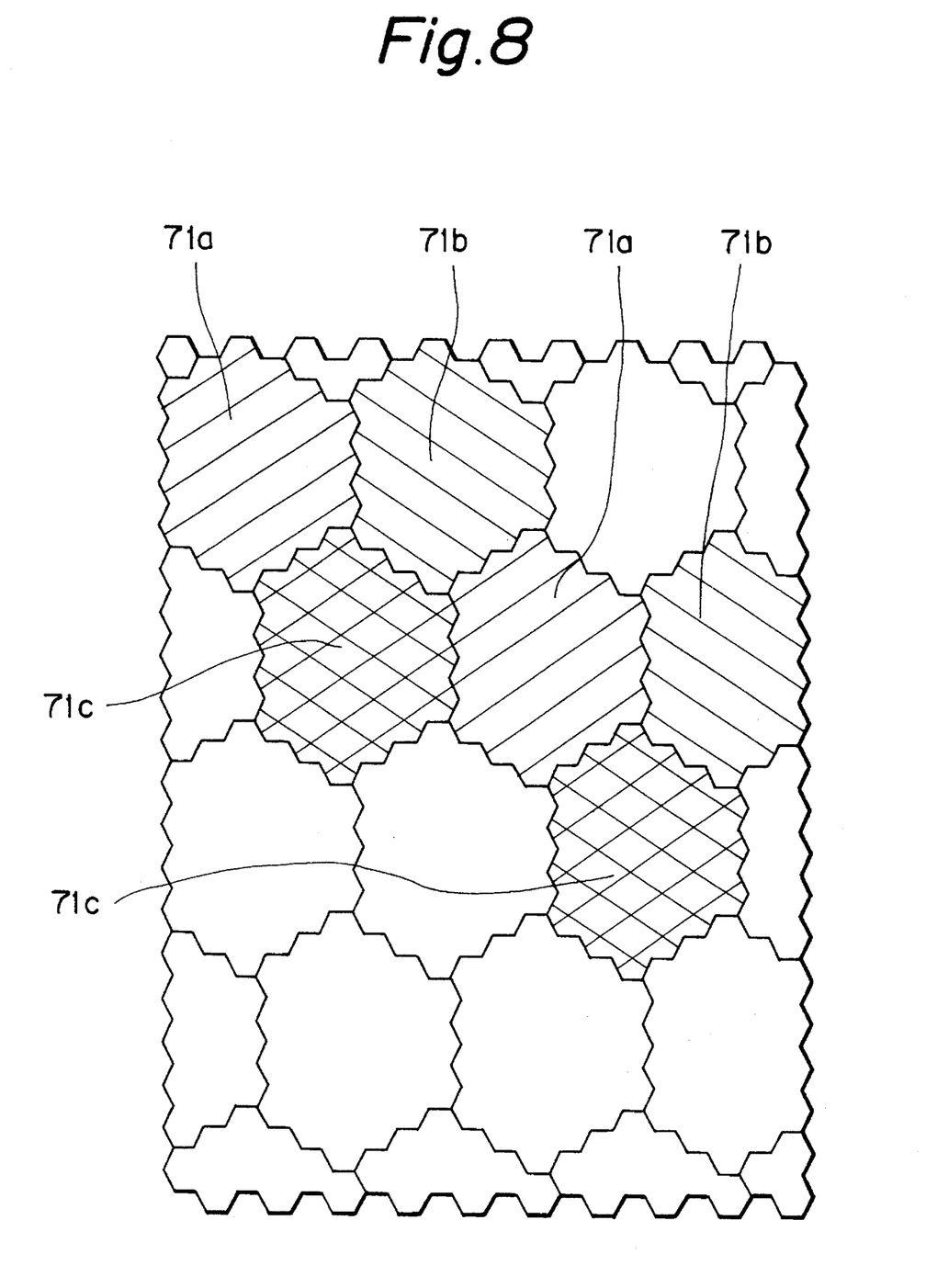
FIG. 8 shows an example of a virtual macro cell structure of the embodiment shown in FIG. 7.

FIG. 8 shows an example of a single layer virtual macro cell structure of the embodiment shown in FIG. 7. In this example, the number of frequencies repeatedly utilized is three.

In the figure, reference numerals 71a denote virtual macro cells using radio link group a, 71b denote virtual macro cells using radio link group b, and 71c denote virtual macro cells using radio link group c, respectively. As is shown, the radio link groups a, b and c are repeatedly reused by another virtual macro cells, respectively. Each of the virtual macro cells is constituted by 27 of micro cells 72, and the service area is closely covered by the plurality of the virtual macro cells 71a, 71b and 71c as shown in FIG. 8.

It should be noted that according to this embodiment, the mobile station communicate with each of the micro cell base stations, not with a virtual macro cell station, and handovers are carried out depending upon its moving speed as follows. For the slowly moving station, a handover including radio link switching is executed every time the station moves out from the current micro cell. For the rapidly moving station, the same radio link is used and thus its switching is not executed every time when the station moves out From the current micro cell so far as the station is located in the same virtual macro cell. If the station moves out from the current virtual macro cell, handover including radio link switching is executed. Therefore, for rapidly moving station, not only the spectrum efficiency can be increased as compared with that in the conventional micro-cellular system, but also number of handovers can be reduced.

Figure 9:
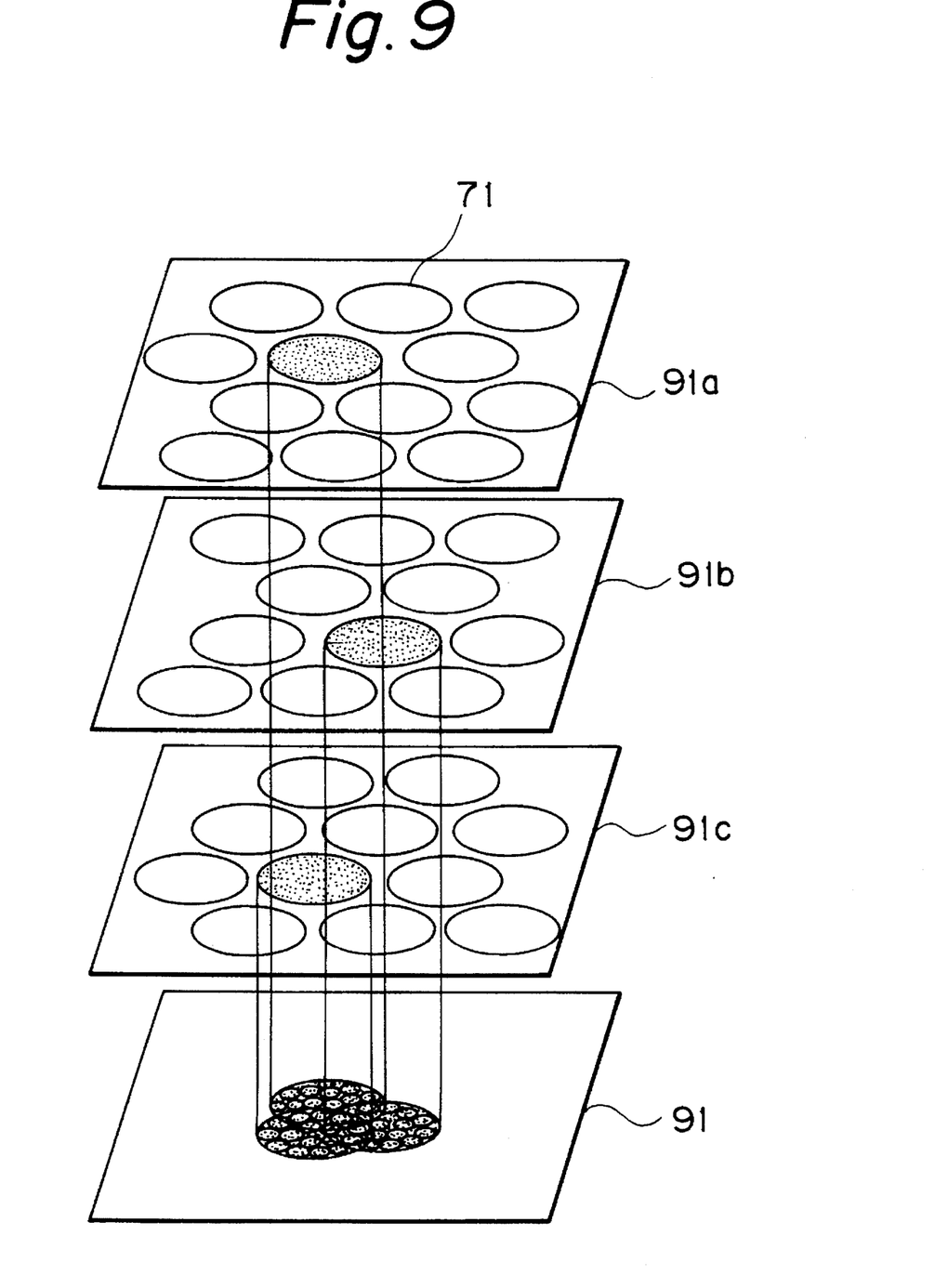
FIG. 9 shows an n-layers cell structure of the virtual macro cell system.

FIG. 9 shows an n-layered cell structure of the virtual macro cell system. In this example, n is equal to 3.

In the FIG., reference numerals 91a denotes a virtual macro cell layer using radio link group a, 91b denotes a virtual macro cell layer using radio link group b, 91c denotes a virtual macro cell layer using radio link group c, and 91 denotes a virtual macro cell structure when the layers 91a, 91b and 91c are superposed, respectively.

Figure 10:
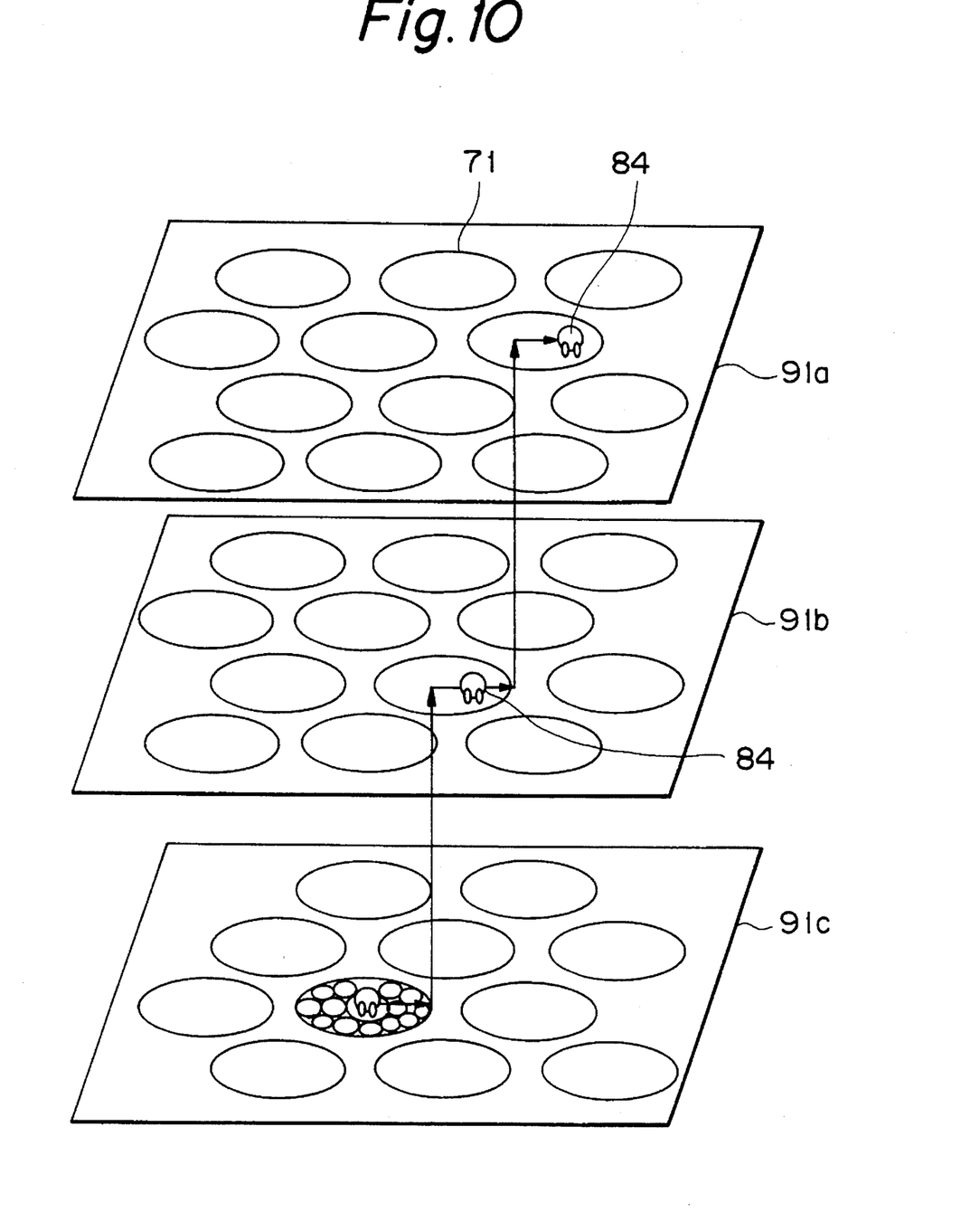
FIG. 10 shows a three-layers virtual macro cell structure.

In the multi-layered cell structure, there are an area covered by only one virtual macro cell layer and an area covered by a plurality of virtual macro cell layers. If the mobile station locates in the area covered by the plurality of the virtual macro cell layers, a virtual macro cell and a virtual macro cell layer for managing this mobile station should be selectively determined before assigning a radio link to this mobile station. The determination of these is conducted by selecting a virtual macro cell whose center is positioned nearest to the mobile station and selecting the layer including this nearest virtual macro cell. Thus, the mobile station can certainly locate near the center portion of the virtual macro cell when the radio link is switched, resulting a chattered handover between cells can be suppressed. Namely, according to the general macro-cellular system, if the mobile station is located near the boundary between the macro cells, since signal strength received from the current macro cell and from the next macro cell will be substantially equal to with each other, a handover from the current cell to the next cell and a reversed handover from the next cell to the current cell may occur repeatedly. However, in this embodiment, since a macro cell is selected for as a next cell so that the center position of the next cell is located near the mobile station as shown in FIG. 10, communication quality just after the handover can be good enough for preventing a chattered handover from generating.

After the virtual macro cell and the virtual macro cell layer for managing the mobile station are determined, a radio link will be assigned to this mobile station.

There are two manner of assigning the radio link to the virtual macro cell layers. One is a fixed assignment fashion and the other is a dynamic assignment.

By the fixed radio link assignment, the radio links are first fixedly assigned to each of the virtual macro cell layers. Then, among these links, an empty link and currently unused link will be assigned to the mobile station in this layer.

By the dynamic radio link assignment, all the radio links are commonly owned by all the virtual macro cell layers. Therefore, it may occur that when a certain radio link is assigned to a first mobile station, a second mobile station already located near the first station in the same virtual macro cell and using the same radio link is subjected to switch the radio link to different one. In order to prevent such trouble from occurring, according to this embodiment, the virtual macro cell radio link control unit 82 shown in FIG. 7 adjusts and manages assignment of the radio links over the plurality of the virtual macro cells. This virtual macro cell radio link control unit 82 also executes selection of the next layer when the radio link has to be switched due to movement of the mobile station from one virtual macro cell to another one, and management of transfer of the information between the switched virtual macro cells.

The general techniques concerning the fixed channel assignment and dynamic channel assignment is described in "MOBILE CELLULAR TELECOMMUNICATION SYSTEM", ISBN 0-07-037030-3, published by McGraw-Hill Inc., pages 245 to 265.

Hereinafter, processable traffic intensities in a service area covered by 20×20=400 of micro cells having a conventional macro cell structure where the number of frequencies repeatedly utilized is seven, having a virtual macro cell structure shown in FIG. 8, and having a three-layers virtual macro cell structure shown in FIGS. 9 and 10 will be compared.

These traffic intensities are calculated by Erlang's loss equation (B-equation) indicating the relationship of infinite incoming/outgoing n/offered traffic a/loss probability B. It is supposed that the number of layers is three, equal number of radio links are Fixedly assigned to the respective layers, and one virtual macro cell is constituted by 27 micro cells.

(1) Processable traffic intensity X in the service area according to a conventional macro cell structure where the number of frequencies repeatedly utilized is seven is calculated by the following equation.

$$X = F(N/M, B) \times M \times L$$

N : number of all radio links available in the service area,
L : number of macro cells using each frequency groups/ service area,
B : regulated loss probability,
f (N/M, B) : traffic intensity processable in a macro cell [erl],
M : number of macro cells where the same radio links are repeatedly reused (= frequency reuse factor),
X : processable all traffic intensity in the service area [erl].

in case N=120, B=0.01, and M=7, L (average value of seven macro cells) becomes L=2.1, thus the processable all traffic intensity X becomes X=142 [erl].

(2) Processable traffic intensity X' in the service area having a virtual macro cell structure shown in FIG. 8 where the number of frequencies repeatedly utilized is three is calculated by the following equation.

$$X' = f(N/M, B) \times M \times L$$

N : number of all radio links available in the service area,
L : number of virtual macro cells using each frequency groups/service area,
B : regulated loss probability,
f (N/M, B) : traffic intensity processable in a virtual macro cell [erl],
M : number of virtual macro cells where the same radio links are repeatedly reused,
X' : processable all traffic intensity in the service area [erl].

in case N=120, B=0.01, and M=3, L (average value of three macro cells) becomes L=4.9, thus the processable all traffic intensity X' becomes X'=426 [erl].

(3) Processable traffic intensity Y in the service area having a three layered macro cell structure shown in FIGS. 9 and 10 is calculated by the following equation.

$$Y = f(N/M', B) \times M' \times L'$$

N : number of all radio links available in the service area,
L : number of virtual macro cells in a virtual macro cell layer/service area,
B : regulated loss probability,
f (N/M', B) : traffic intensity processable in a virtual macro cell [erl],
M' : number of layers
Y : processable all traffic intensity in the service area [erl].

in case N=120, B=0.01, and M'=3, L (average value of three layers) becomes L=8.5, thus the processable all traffic intensity X becomes X=740 [erl].

As will be apparent form the above- comparison, processable traffic intensity of the virtual macro cell structure is three times greater, and that of the three layered virtual macro cell structure is 5.2 times greater than that of the conventional macro cell structure where the number of frequencies repeatedly utilized is seven, causing the number of subscribers capable of simultaneously communicating to extremely increase.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mobile communication system having a cell structure constituted by integrating macro cells and micro cells, said system including at least one mobile station, said cell structure covering a unit service area by a plurality of the micro cells each having a predetermined size and covering the same unit service area by the single macro cell having a larger size than the size of said micro cell, each of said micro cells including a micro cell base station for transmitting at least radio control channel at a predetermined frequency and slot, said mobile station including means for repeatedly measuring received level of the radio control channels from said micro cell base stations, means for estimating its moving speed in accordance with changing rate of the measured level, and means for selecting, in accordance with the estimated moving speed, a radio link control between the mobile station and the base station to be executed by the micro cell or by the macro cell; and wherein said moving speed estimation means includes means for judging the maximum leveled base station in accordance with the measured received level, means for calculating a period between times at each of which the maximum leveled base station changes, and means for judging whether the moving speed is high or low by comparing the calculated period with a threshold value.

2. A system as claimed in claim 1, wherein said means for selecting the radio link control is executed by a micro cell when the estimated moving speed is a first speed which is substantially equal to or lower than a walking speed, and by a macro cell when the estimated moving speed is a second speed higher than the first speed.

3. A system as claimed in claim 2, said mobile station accesses both the micro cell base station and the macro cell base station using a common radio interface so as that it makes access to the micro cell base station when the estimated moving speed is the first speed, and to the macro cell base station when the estimated moving speed is the second speed.

4. A system as claimed in claim 3, wherein said micro cell base stations transmit time division radio control channels, respectively, in synchronous with frames of time division radio control channels transmitted from the macro cell base station.

5. A system as claimed in claim 3, wherein said micro cell base stations transmit time division radio control channels, respectively, in synchronous with frames of time division control channels transmitted via optical fibers from the macro cell base station.

6. A system as claimed in claim 3, wherein said moving speed estimation means judges that the moving speed is high when it is impossible to calculate said period between times at each of which the maximum leveled base station changes.

7. A system as claimed in claim 3, wherein said measuring means include means for measuring received level of the radio control channels from said micro cell base station at a predetermined interval.

8. A system as claimed in claim 1, wherein said moving speed estimation means judges that the moving speed is high when it is impossible to calculate said period between times at each of which the maximum leveled base station changes.

9. A system as claimed in claim 1, further comprising a measuring means which includes means for measuring received level of the radio control channels from said micro cell base stations at a predetermined interval.

10. A system having a cell structure constituted by integrating macro cells and micro cells, said system including at least one mobile station, said cell structure covering a unit service area by a plurality of the micro cells each having a predetermined size and covering the same unit service area by the single macro cell having a larger size than the size of said micro cell,     each of said micro cells including a micro cell base station for transmitting at least radio control channel at a predetermined frequency and slot,     said mobile station including means for repeatedly measuring received level of the radio control channels from said micro cell base stations, means for estimating its moving speed in accordance with changing rate of the measured level, and means for selecting, in accordance with the estimated moving speed, a radio link control between the mobile station and the base station to be executed by the micro cell or by the macro cell;

wherein said means for selecting the radio link control is executed by a micro cell when the estimated moving speed is a first speed which is substantially equal to or lower than a walking speed, and by a macro cell when the estimated moving speed is a second speed higher than the first speed;

wherein said macro cells are virtual macro cells each of which is a virtually treated area covered by a plurality of the micro cells; and     wherein said moving speed estimation means includes means for judging the maximum leveled base station in accordance with the measured received level, means for calculating a period between times at each of which the maximum leveled base station changes, and means for judging whether the moving speed is high or low by comparing the calculated period with a threshold value.

11. A system as claimed in claim 10, wherein said system has a single layer cell structure constituted by a service area covered a plurality of the virtual macro cells arranged so that the micro cells simultaneously using the same frequency in the virtual macro cell are separated with each other by a predetermined necessary distance.

12. A system as claimed in claim 10, wherein said means for judging whether the moving speed is high judges that the moving speed is high when it is impossible to calculate said period between times at each of which the maximum leveled base station changes.

13. A system as claimed in claim 10, wherein said measuring means include means for measuring received level of the radio control channels from said micro cell base stations at a predetermined interval.

14. A system having a cell structure constituted by integrating macro cells and micro cells, said system including at least one mobile station, said cell structure covering a unit service area by a plurality of the micro cells each having a predetermined size and covering the same unit service area by the single macro cell having a larger size than the size of said micro cell,     each of said micro cells including a micro cell base station for transmitting at least radio control channel at a predetermined frequency and slot,     said mobile station including means for repeatedly measuring received level of the radio control channels from said micro cell base stations, means for estimating its moving speed in accordance with changing rate of the measured level, and means for selecting, in accordance with the estimated moving speed, a radio link control between the mobile station and the base station to be executed by the micro cell or by the macro cell;

wherein said means for selecting the radio link control is executed by a micro cell when the estimated moving speed is a first speed which is substantially equal to or lower than a walking speed, and by a macro cell when the estimated moving speed is a second speed higher than the first speed;

wherein said macro cells are virtual macro cells each of which is a virtually treated area covered by a plurality of the micro cells;

wherein said system has a multi-layered cell structure, each of the layers being constituted by a service area covered by a plurality of the virtual macro cells arranged so that the micro cells simultaneously using the same frequency in the virtual macro cell are separated with each other by a predetermined necessary distance, the virtual macro cells in the same layer being capable of reusing the same radio link.

15. A system as claimed in claim 14, wherein said system further include means for executing a handover provided with radio link switching when the mobile station moves out from its current virtual macro cell so that the virtual macro cell having a center portion located near the mobile station is selected as a next virtual macro cell.

16. A system as claimed in claim 15, wherein the radio links are fixedly assigned to each of the layers, an empty link of said links being assigned to the mobile station in the corresponding layer.

17. A system as claimed in claim 15, wherein all the radio links are commonly owned by all the virtual macro cell layers, an available empty link of all said links being dynamically assigned to the mobile station.

\* \* \* \* \*